(12) United States Patent
Rich et al.

(10) Patent No.: US 7,627,351 B2
(45) Date of Patent: Dec. 1, 2009

(54) CELLULAR ALERT DEVICE

(76) Inventors: Doug L. Rich, 1346 S. Beech St., Ottawa, KS (US) 66067; Jason R. Maxwell, 417 W. 17th Ter., Ottawa, KS (US) 66067; Vance Finch, 518 N. Spruce St., Ottawa, KS (US) 66067

( * ) Notice: Subject to any disclaimer, the term of this patent is extended or adjusted under 35 U.S.C. 154(b) by 476 days.

(21) Appl. No.: 11/484,403

(22) Filed: Jul. 11, 2006

(65) Prior Publication Data
US 2008/0014900 A1  Jan. 17, 2008

(51) Int. Cl.
*H04B 1/38* (2006.01)
(52) U.S. Cl. .................................. 455/567; 455/550.1
(58) Field of Classification Search ................ 455/567, 455/550.1
See application file for complete search history.

(56) References Cited
U.S. PATENT DOCUMENTS

| | | |
|---|---|---|
| 6,218,958 B1 | 4/2001 | Eichstaedi et al. |
| 6,424,251 B1 * | 7/2002 | Byrne ....................... 340/7.58 |
| 6,650,231 B1 | 11/2003 | Byrne |
| 6,954,659 B2 | 10/2005 | Tushinsky et al. |
| 2004/0204153 A1 * | 10/2004 | Benco et al. ................ 455/567 |

* cited by examiner

*Primary Examiner*—Nick Corsaro
*Assistant Examiner*—Amanuel Lebassi
(74) *Attorney, Agent, or Firm*—Dale J. Ream

(57) ABSTRACT

A cellular alert device according to the present invention notifies a user that a cellular call is being received by an associated cellular telephone even when the alert device is not in close proximity or in data communication with the associated telephone. The cellular alert device includes a receiver for acquiring the same cellular paging signal that is also received by an associated cellular telephone. The alert device also includes a processor and an alarm such that the processor actuates the alarm when the receiver acquires a paging signal that is the same as that received by the associated telephone. The alert device and telephone are "associated" in that they both have the same mobile identification code.

10 Claims, 5 Drawing Sheets

CELLULAR ALERT DEVICE

BACKGROUND OF THE INVENTION

The present invention relates generally to cellular communication devices and, more particularly, to a cellular alert device for notifying a user that a cellular call is being received by an associated cellular telephone with the alert device not being in close proximity or in data communication with the associated telephone.

Cellular phones, including digital walkie-talkie type telephones, are in popular use by consumers, both for personal and business communications. A common problem, however, is that cell phone users do not always have their cell phones in close proximity to their person when a call is received and, thus, are not available to answer it. For example, men in the workplace may keep their portable telephones in a desk drawer and miss calls when they are not near their desks when a call comes in. Similarly, women sometimes leave their cell phones in their purses which may then be situated away from them when a call is received. Still another frequently experienced example is when a cell phone owner is engaged in a leisure activity, such as swimming, boating, or working out in a gym, and have stowed their phone in a locker, vehicle, or the like.

Various proposals for alerting a user that an incoming call is being received by the user's cell phone have been made in the art. More particularly, U.S. Pat. No. 6,218,958 to Eichstaedt discloses a tactile notification device that can be worn by a person and which can receive alert signals from a plurality of other personal computing devices, such as a cell phone, pager, or laptop computer (also being worn by the user) and generates respective tactile signals detectable by the user. Although assumably effective for its intended purpose, this system requires multiple other devices to transmit a signal to the alert device receiver and requires the other devices to be in close proximity to the alert device.

While still other patents have proposed having an alert device for notifying a user that a cell phone or other personal electronic device has been actuated, there is a need for a device that may be actuated independent of the cell phone itself and that does not require transmission of an auxiliary signal by the cell phone.

Therefore, it would be desirable to have a cell phone alert device for notifying a cell phone owner that an associated cell phone is presently receiving an incoming transmission. Further, it would be desirable to have a cell phone alert device that receives said incoming call notification independently of the telephone itself, even if separated from the telephone by a relatively long distance. In addition, it would be desirable to have a cell phone alert device that receives the incoming call notification substantially simultaneously with the associated telephone's receipt thereof. And, it would also be desirable if the cell phone alert device could be worn by a user in a convenient and fashionable manner

SUMMARY OF THE INVENTION

Accordingly, the present invention provides a cell phone alert device that communicates with a cellular network for providing notice to a user that an associated cell phone is receiving an incoming call. To fully appreciate the present invention, it should be understood that a cellular telephone is essentially a radio transmitter/receiver that is connected to the traditional telephone network through a network of cellular towers. The cellular network includes many cellular towers so as to provide a substantial coverage area. These towers divide the coverage area into "cells," each of which covers about 10 square miles. The main advantage of having multiple cells is that it allows for frequency reuse. Since only about 800 frequencies have been made available by the Federal Communications Commission (FCC), frequency reuse is essential if more than 800 cell phones are to be in use at any given time. Therefore, the same frequencies are used for cellular transmissions without confusion so long as no two adjacent cells use the same frequency ranges.

Full appreciation of the present invention also requires a summary of how a cellular call is made. The control towers and cell phones exchange data along multiple types of channels. A control channel carries cellular system data and manages call setup. Voice channels enable the actual phone conversations, e.g. voice data exchange. Data channels provide for changing frequencies as a cell phone is moved from one cell to another. A cell phone sends a signal including its mobile identification number to the cell tower having the strongest signal. These communications, which occur frequently even when no phone call is in process, enable the control towers to "know" the location of every cell phone at all times (when it is powered up) and to assign associated frequencies that will be used to manage phone calls.

When an incoming call is made to a cell phone, the tower for the cell in which that cell phone is located sends a paging signal to the appropriate phone—letting it know that a phone call needs to be received. The other channels, as described above, then coordinate incoming and outgoing messages, i.e. the phone call is carried out.

Accordingly, a cell phone alert device according to the present invention includes a receiver for acquiring a cellular transmission that is also (simultaneously) received by the associated telephone. The alert device further includes an alarm and a processor that actuates the alarm when the receiver acquires the cellular transmission.

The cell phone alert device and telephone are said to be "associated" in that they both include the same mobile identification code. Accordingly, the cell phone alert device and the cell phone may both be actuated simultaneously and independently of one another so long as they are situated in the same cell, even though they may be miles apart. The alert device does not need to include a transmitter as it does not need to transmit an alert signal to the telephone and does not transmit voice data.

Therefore, a general object of this invention is to provide a cell phone alert device for notifying a user of an incoming phone call to an associated cell phone.

Another object of this invention is to provide a cell phone alert device, as aforesaid, that is actuated simultaneously with and independently of the associated cell phone.

Still another object of this invention is to provide a cell phone alert device, as aforesaid, that is not in not in communication with the associated cell phone.

Yet another object of this invention is to provide a cell phone alert device, as aforesaid, that may be worn as a watch, pendent, bracelet, or other fashionable jewelry.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
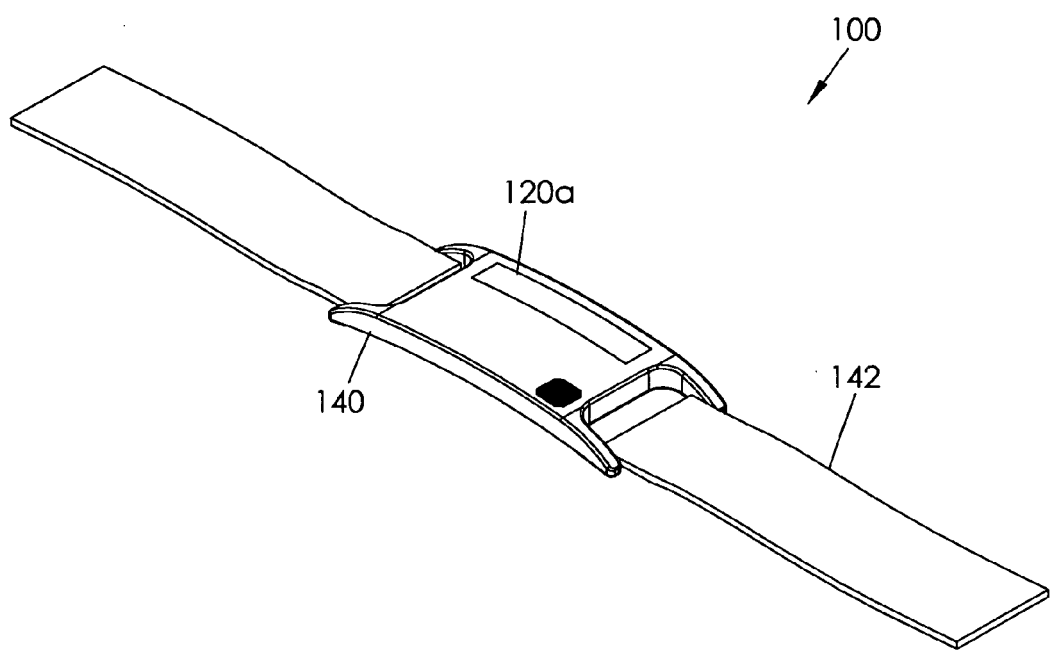
FIG. 1 is a perspective view of a cellular alert device according to a preferred embodiment of the present invention.

A cellular alert device 100 and a cellular communications system 500 according to the present invention will now be described in detail with reference to FIGS. 1 through 5 of the accompanying drawings. More particularly, a cellular alert device 100 for use with a cellular telephone 10 according to the current invention includes a receiver 110 (also referred to herein as an alert receiver 110) for acquiring a cellular transmission, an alarm 120 (also referred to herein as an alert alarm 120), and a processor 130 (also referred to herein as an alert processor 130). It should be appreciated that although the present invention is primarily described herein as a "cellular" alert device and system and refers to use with a cellular telephone, it is intended that the present invention also applies to digital telephones and telephone networks, e.g. "walkie-talkie" type telephones, satellite telephones, and the like.

Figure 3:
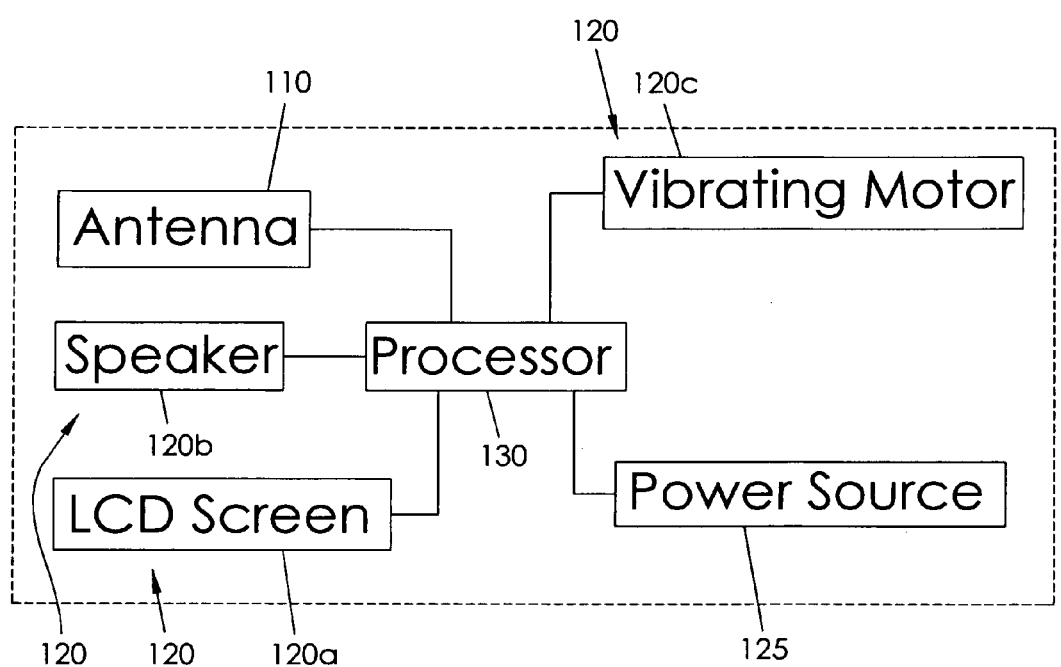
FIG. 3 is a block diagram illustrating the electronic components of the cellular alert device as in FIG. 1.

The receiver 110 may be any receiver capable of receiving a cellular transmission, and the alarm 120 may include, for example, a visual alarm 120a (e.g., a display), an audible alarm 120b (e.g., a speaker), and/or a tactile alarm 120c (e.g., a vibrator). A power source 125 may be in electrical communication with the receiver 110, the alarm 120, and the processor 130, as shown in FIG. 3.

Figure 2:
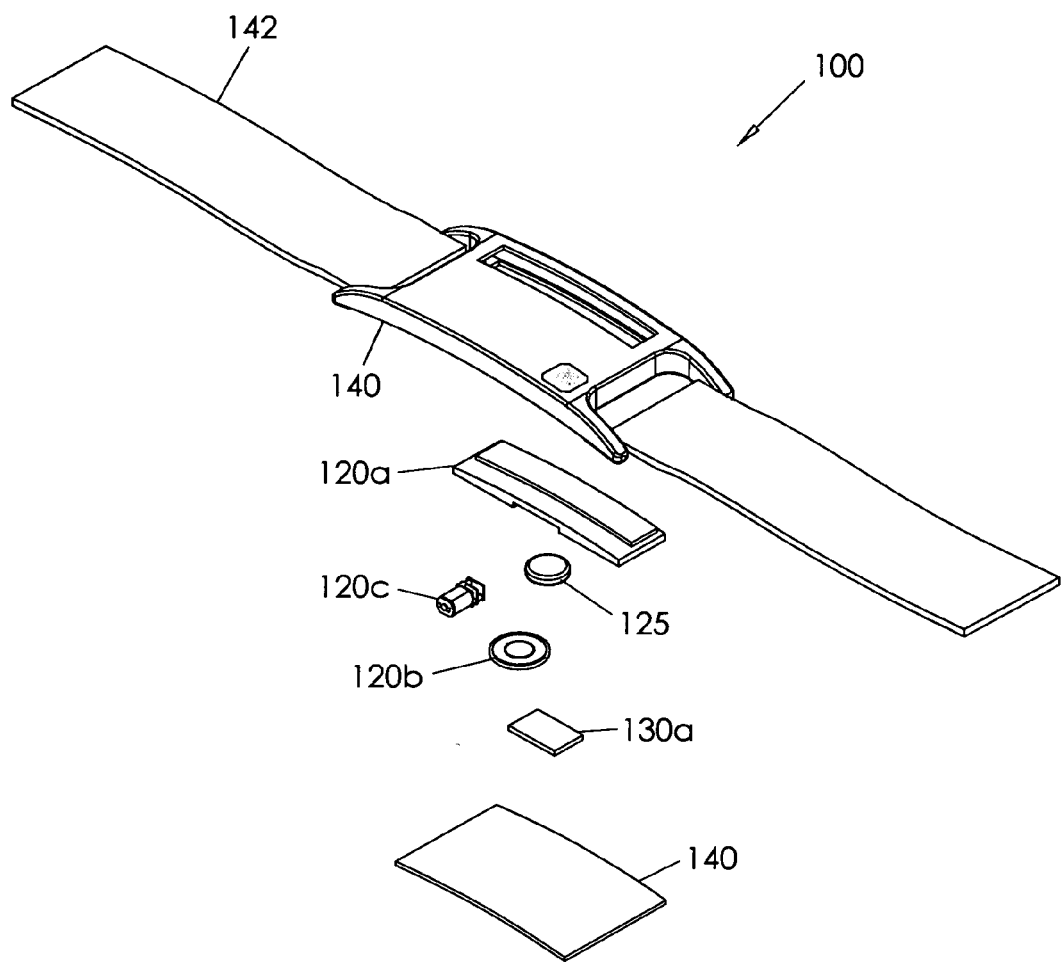
FIG. 2 is an exploded view of the cellular alert device as in FIG. 1.
Figure 5:
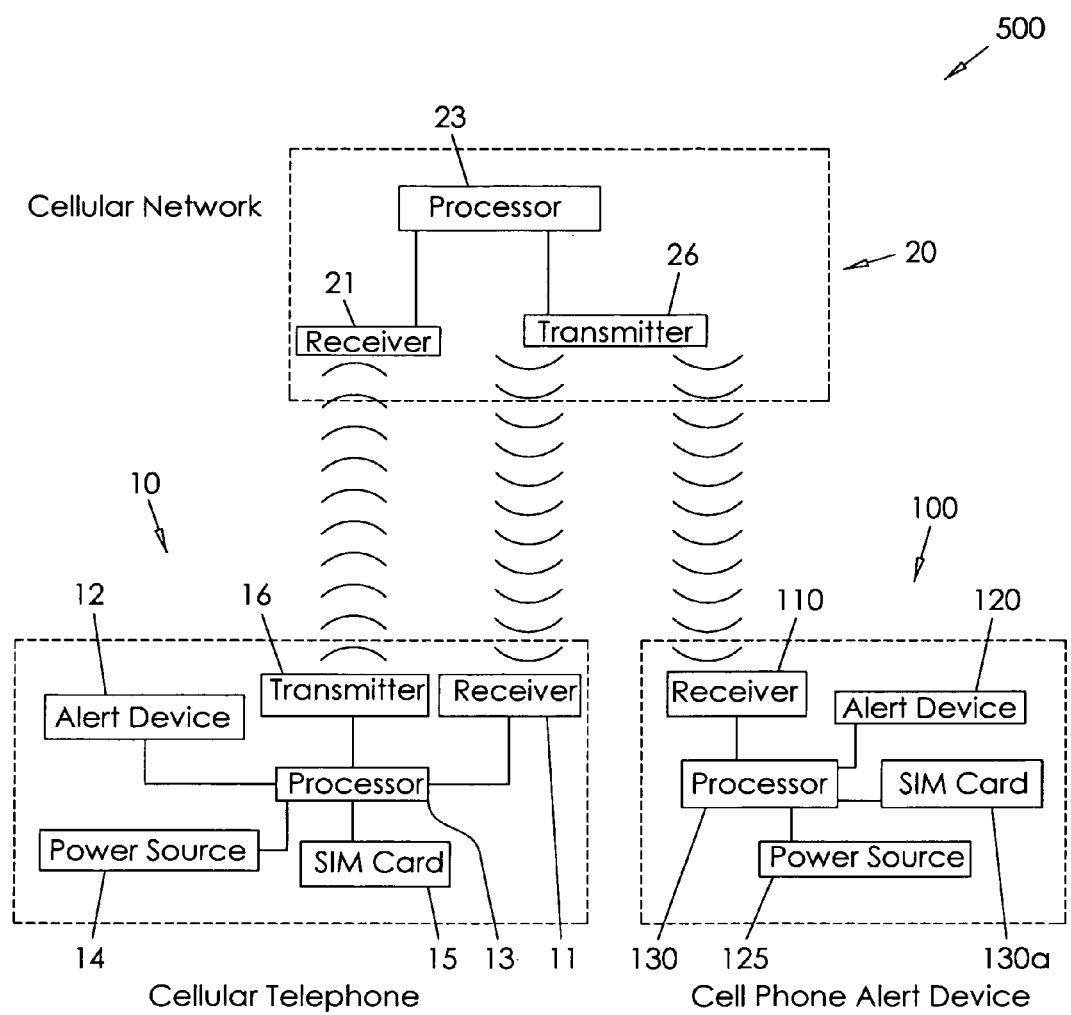
FIG. 5 is a block diagram of a cellular network according to the present invention.

The processor 130 is in data communication with the receiver 110 and the alarm 120 to actuate the alarm 120 when the receiver 110 acquires a cellular transmission having or consisting of a paging signal 5a (FIG. 5). In other words, the processor 130 may include programming for actuating the alarm 120 when the receiver 110 acquires a paging signal 5a. As shown in FIGS. 1 and 2, the receiver 110, the alarm 120, and the processor 130 may be situated inside (operatively coupled to) a housing 140 (e.g., a watch-like casing as shown in FIG. 1 or a pendant). Preferably, the housing 140 includes a configuration that is fashionable and may be viewed as jewelry. Means for attaching the housing 140 to a user may be included. More particularly, a strap 142, necklace, bracelet, belt clip, etc. may be used to attach the housing 140 to a user. Further, the housing 140 preferably includes a construction that is waterproof.

As known in the art, the telephone 10 may have a mobile identification number that allows a cellular communication system (such as the inventive cellular communications system 500 described below, for example) to distinguish between multiple telephones 10. In other words, the telephone's mobile identification number may associate the telephone 10 with a predetermined paging signal 5a. The processor 130 may have a mobile identification number equivalent to the mobile identification number of the telephone 10. The alert device's mobile identification number may associate the alert device 100 with the predetermined paging signal 5a associated with the telephone 10. The processor 130 may have the mobile identification number through various manners, such as through a removable memory card (e.g., a "SIM" card 130a as shown in FIG. 5) compatible with the processor 130 or through programming of the processor 130 itself, for example.

Preferably, the alert device 100 does not include a transmitter, whereby to conserve the power source 125, and, as shown in FIG. 5, the alert device 100 preferably operates independently of the telephone 10. In other words, the alert device 100 is preferably not in direct communication with the telephone 10. Not only does the alert device 100 not transmit an alert signal to the telephone 10 nor receive one therefrom, it does not transmit voice data either. Some exemplary benefits of this unique device are described below.

In use, the cellular alert device 100 may identify a user of an incoming telephone call on an associated cellular telephone 10 independently of the telephone 10. This may be useful, for example, when the user cannot or does not want to have the telephone 10 on his person, within his line of sight, or within hearing range. As shown in FIG. 5, the telephone 10 may include a telephone receiver 11, a telephone alarm 12, a telephone power source 14, a telephone memory device 15 (e.g., a "SIM" card) having the mobile identification number, a telephone transmitter 16, and a telephone processor 13 in data communication with the telephone receiver 11 and the telephone transmitter 16.

The alert receiver 110 may acquire a paging signal 5a that is also received by the telephone 10, as shown in FIG. 5. The alert processor 130 may actuate the alarm 120 when the alert receiver 110 acquires the paging signal 5a to notify the user that a call is being sent to the telephone 10. Because there is no need for communication between the alert device 100 and the telephone 10, and because the alert receiver 110 and the telephone receiver 11 acquire the paging signal 5a substantially simultaneously and entirely independently, there is essentially no lag time between the time the call is received by the telephone 10 and the time the alert alarm 120 notifies the user of the call. Further, because there is no communication required between the alert receiver 110 and the telephone 10, additional power is not consumed unnecessarily. Importantly, it should be appreciated that for the alert device and telephone to be activated independently and substantially simultaneously, they need only be located within the same "cell," i.e. be within transmission range of the same cellular transmission tower.

A cellular communications system 500 is shown in FIG. 5 and includes the alert receiver 110 as described above, the telephone 10 as described above, and a stationary unit 20. The stationary unit 20 (e.g., a cellular tower) has a stationary receiver 21, a stationary transmitter 26, and a stationary processor 23 in data communication with the stationary receiver 21 and the stationary transmitter 26.

Figure 4:
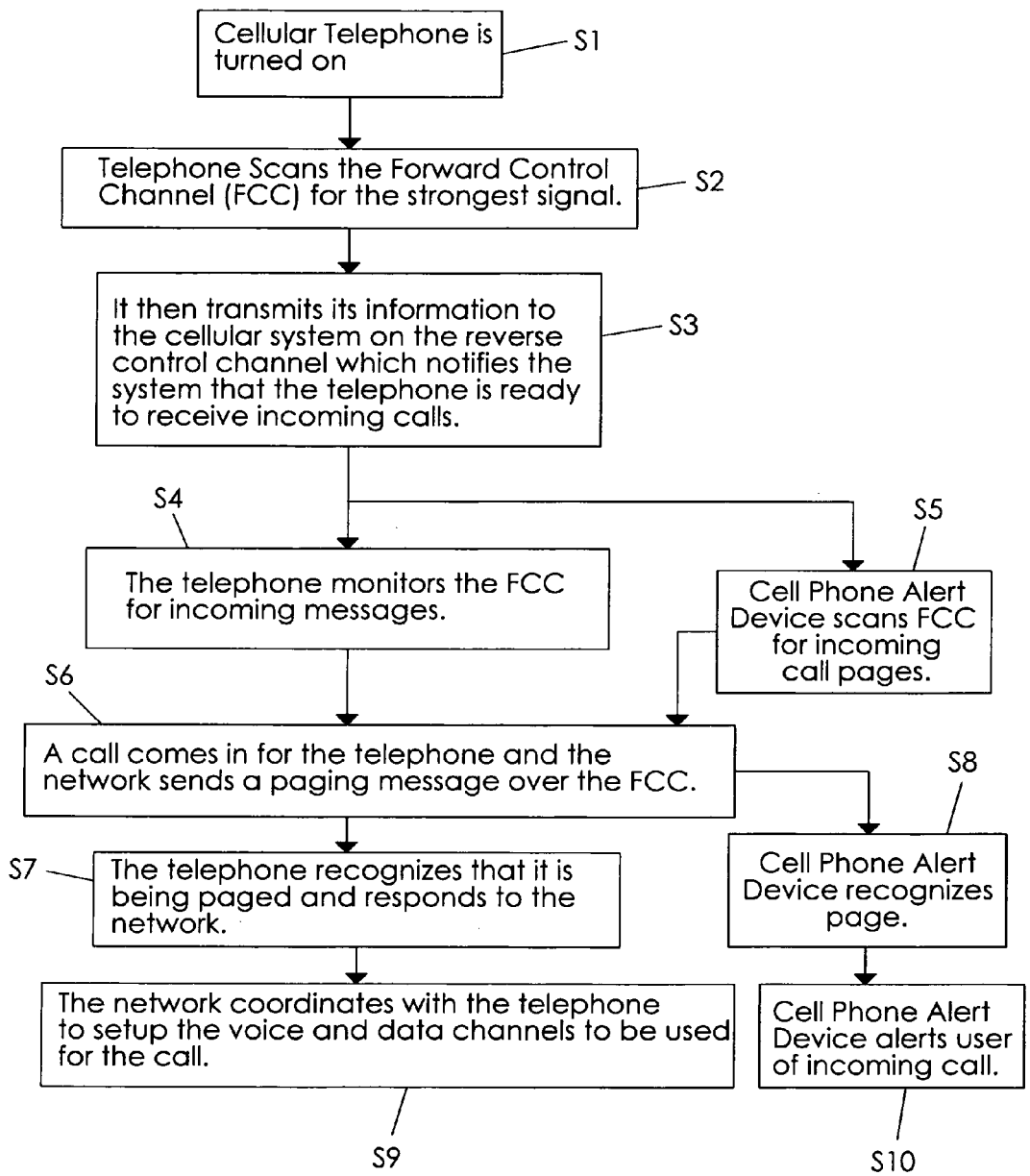
FIG. 4 is a block diagram of an exemplary process illustrating use of the cellular alert device according to the present invention.

FIG. 4 shows an exemplary process followed during use of the system 500. The term "incoming communications signals" is used herein to reference signals sent by the stationary transmitter 26 to provide incoming communications (e.g., voice data and/or call setup data being sent to the telephone 10); the term "outgoing communications signals" is used herein to reference signals sent by the telephone transmitter 16 to provide outgoing communications (e.g., voice data being sent from the telephone 10). At step S1, the telephone 10 is turned on. The process then proceeds to step S2, where the telephone processor 13 scans the Forward Control Channel (FCC) for the strongest signal. The process continues to step S3, where the telephone transmitter 16 transmits its mobile identification number to the stationary receiver 21 to notify the stationary processor 23 that the telephone 10 is ready to receive incoming calls. The process then diverges to steps S4 and S5, which preferably occur substantially simultaneously.

At step S4, the telephone receiver 11 monitors the FCC for a paging signal 5a that signifies an incoming message. At step S5, the alert receiver 110 monitors the FCC for the same paging signal 5a that signifies an incoming message. The process then continues to step S6.

At step S6, a call comes into the system 500 for the telephone 10, and the stationary transmitter 26 sends a paging signal over the FCC to notify the telephone 10 and the alert device 100 of the incoming call. The process then diverges to steps S7 and S8, which preferably occur substantially simultaneously.

At step S7, the telephone receiver 11 receives the paging signal 5a, the telephone processor 13 actuates the telephone transmitter 16, and the telephone transmitter 16 transmits an outgoing communications signal. At step S8, the alert receiver 110 acquires the paging signal 5a. Step S7 immediately proceeds to step S9, and step S8 immediately proceeds to step S10.

At step S9, the stationary receiver 21 receives the outgoing communications signal from the telephone transmitter 16, and the stationary processor 23 actuates the stationary transmitter 26 to transmit at least one incoming communications signal to the telephone receiver 11.

At step S10, the alert processor 130 actuates the alert alarm 120 to notify the user of the incoming call.

The paging signals 5a may include time data and/or caller identification data, and the alert device may include a display (which may be the same as or different from visual alarm 120a) to display the time data at any point in time and/or the caller identification data at step S10.

It is understood that while certain forms of this invention have been illustrated and described, it is not limited thereto except insofar as such limitations are included in the following claims and allowable functional equivalents thereof.

What is claimed is as follows:

1. A cellular alert device for notifying a user, independently of the telephone itself, that a paging signal is being received by a telephone receiver of an associated cellular telephone, said alert device comprising:
    a receiver for acquiring a paging signal;
    an alarm;
    an alert device processor in communication with said receiver and said alarm to actuate said alarm when said receiver acquires said paging signal;
    wherein:
        the telephone includes a mobile identification number;
        said processor includes a mobile identification number equivalent to the mobile identification number of the telephone;
        said alert device does not include a transmitter;
        said alert device operates independently of the cellular telephone;
    wherein said paging signal received by said telephone receiver and said alert device receiver is the same signal; and
    wherein said telephone receiver and said alert device receiver respectively acquire said paging signal substantially simultaneously.

2. The alert device as in claim 1, further comprising a power source in electrical communication with said receiver, said alarm, and said processor.

3. The alert device as in claim 1, wherein said alarm is selected from the group consisting of a visual alarm, an audible alarm, and a tactile alarm.

4. The alert device as in claim 1, wherein said alarm includes at least one item selected from the group consisting of a display, a speaker, and a vibrator.

5. The alert device as in claim 1, wherein said receiver, said alarm, and said processor are situated inside a housing.

6. The alert device as in claim 5, further including means for attaching said housing to a user.

7. A cellular communications system, comprising:
    a stationary unit having:
        a stationary transmitter for transmitting paging signals to notify of incoming calls and incoming communications signals to provide incoming communications;
        a stationary receiver for receiving outgoing communications signals; and
        a stationary processor in data communication with said stationary transmitter and said stationary receiver for actuating said stationary transmitter to transmit at least one said incoming communications signal after said stationary receiver receives at least one said outgoing communications signal;
    a telephone having:
        a telephone receiver for acquiring at least one said paging signal and at least one said incoming communications signal;
        a telephone transmitter for transmitting at least one said outgoing communications signal; and
        a telephone processor in data communication with said telephone receiver and said telephone transmitter for actuating said telephone transmitter to transmit at least one said outgoing communications signal after said telephone receiver receives at least one said paging signal;
    an alert device separate from said telephone, said alert device having:
        an alert receiver for acquiring said at least one paging signal acquired by said telephone receiver, said telephone receiver and said alert receiver acquiring said at least one paging signal independently and simultaneously;
        an alarm; and
        an alert processor in communication with said alert receiver and said alarm for actuating said alarm when said alert receiver acquires said at least one paging signal acquired by said telephone receiver.

8. The system as in claim 7, wherein said alert device is not in direct data communication with said telephone.

9. The system as in claim 7, wherein:
    said paging signals respectively include at least one item selected from the group consisting of caller identification data and time data; and
    said alert device includes a display for displaying said at least one item included in said paging signals.

10. The system as in claim 7, wherein:
    said telephone has a mobile identification number to associate said telephone with a predetermined said paging signal; and
    said alert device has a mobile identification number equivalent to the mobile identification number of said telephone to associate said alert device with said predetermined paging signal associated with said telephone.

* * * * *